United States Patent [19]

Hergenrother

[11] 3,928,490

[45] Dec. 23, 1975

[54] BLOCK POLYMERS OF POLYSILOXANES AND POLYBUTADIENE

[75] Inventor: William L. Hergenrother, Akron, Ohio

[73] Assignee: The Firestone Tire & Rubber Company, Akron, Ohio

[22] Filed: Aug. 16, 1973

[21] Appl. No.: 388,876

Related U.S. Application Data

[63] Continuation-in-part of Ser. No. 232,610, March 7, 1972, abandoned, which is a continuation-in-part of Ser. No. 52,136, July 2, 1970, abandoned.

[52] U.S. Cl. .................................. 260/827; 260/887
[51] Int. Cl.² .................... C08L 53/00; C08L 83/10
[58] Field of Search ................... 260/827, 874, 887

[56] References Cited
UNITED STATES PATENTS

| | | | |
|---|---|---|---|
| 2,867,603 | 1/1959 | Safford et al. | 260/827 |
| 3,051,684 | 8/1962 | Morton et al. | 260/827 |
| 3,244,664 | 4/1966 | Zelinski et al. | 260/94.7 R |
| 3,483,270 | 12/1969 | Bostick | 260/827 |
| 3,637,899 | 1/1972 | Nametkin et al. | 260/827 |
| 3,691,257 | 9/1972 | Kendrick et al. | 260/827 |

FOREIGN PATENTS OR APPLICATIONS

| | | | |
|---|---|---|---|
| 589,942 | 12/1959 | Canada | 260/827 |

*Primary Examiner*—Wilbert J. Briggs, Sr.

[57] ABSTRACT

Block polymers are produced by polymerizing butadiene and joining to polysiloxane to make a copolymer with alternating blocks of polybutadiene and polysiloxane. The products are useful for the manufacture of gaskets, hose, belts, and other products designed for high-temperature use.

5 Claims, No Drawings

BLOCK POLYMERS OF POLYSILOXANES AND POLYBUTADIENE

This application is a continuation-in-part of my application Ser. No. 232,610 filed Mar. 7, 1972 which is a continuation-in-part of my application Ser. No. 52,136 filed July 2, 1970, both now abandoned.

This invention relates to new copolymers which are alternating block polymers derived from polysiloxanes and polybutadienes, and their production. The block copolymers retain their elasticity and flexibility at high temperatures and are useful for gaskets, hose, belts and other products which are to be used where they must withstand high temperatures.

The polysiloxanes to which this invention relates are different from the cyclotrisiloxanes and cyclotetrasiloxanes used as monomers in Morton et al. U.S. Pat. No. 3,051,684 and Bostick U.S. Pat. No. 3,483,270. The polysiloxanes of this invention are straight-chain polymers having the formula $(R_2SiO)_x$. Both R's may be the same or different and $x$ is above 1400 and preferably about 4000 up to about 10,000 or more. One or both R's are preferably methyl, but may be other alkyl groups, preferably groups containing 1 to 4 carbon atoms, such as ethyl, propyl and butyl, or one R may be an aryl group, usually phenyl, although the use of other aryl groups such as tolyl and either alpha or beta naphthyl are not necessarily excluded. Compounds in which the R's are both methyl, or one is methyl and the other is phenyl, are preferred.

The cyclotrisiloxanes and cyclotetrasiloxanes produce block polymers by ring-opening polymerization and form linear polysiloxanes. The cyclotrisiloxane reacts as indicated by the following formula:

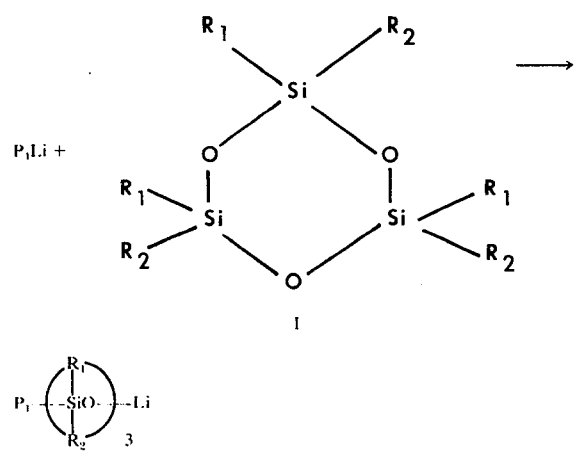

and the cyclotetrasiloxane reacts in a similar manner to produce a lithiated polymer containing four siloxane groups. This polymer further reacts as indicated in the following:

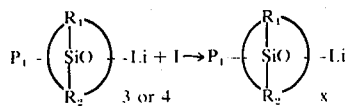

where $x$ is a desired number.

Such reactions and polymer products are to be distinguished from the alternating block polymers of this invention produced by the reaction indicated below, in which a dilithium catalyst is used to produce a dilithiated polymer identified as $P_2$ to distinguish it from monolithiated polymer $P_1$ of the prior art.

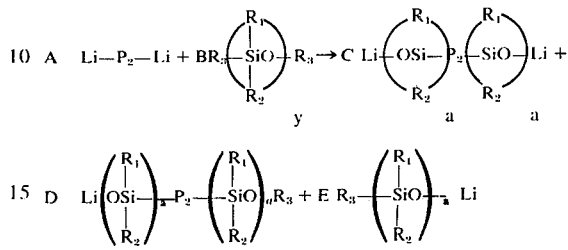

in which $$a = \frac{y}{1+2\ A/B}$$

and $y$ is equal to any number between about 4000 and about 10,000 or more, C is equal to $$\frac{A-1}{B}$$

and D and E are each equal to B; and generally speaking A/B is about 10 to 100.

On neutralization with an acid the polymer $(P_2Si)_x$ is formed in which $P_2$ represents a polybutadienyl polymer of at least 60 per cent vinyl content, Si represents a polydimethylsiloxane and $x$ is a small number from about 2 to 20.

The block polymer of this invention may contain as little as 1 per cent by weight of polybutadiene and when cured with dicumyl peroxide or other peroxide which gives $R(CH_3)_2CO$. radicals in which R is a hydrocarbon radical containing 1 to 20 carbon atoms, cures very rapidly as compared with silicone polymers which contain no polybutadiene. The block polymer has good heat resistance and generally improved curing as compared with polysiloxanes. The block polymer may include larger amounts of the polysiloxane, up to for example 20 or 25 or even 40 or 50 per cent by weight. It generally will not include much over 20 per cent by weight which yields a product having good elastomeric properties.

The vinyl content (1,2-content) of the polybutadiene should be greater than the presence of 1,4-content and will usually be from 60 to 75 per cent by weight or more, such as 80 per cent, and may be as high as 100 per cent, although polybutadienes of over 90 or 95 per cent 1,2-content are not generally commercial at the present time. Polybutadiene with a vinyl content of over 60 per cent was used in each of the examples.

The catalyst used may be an alkyldilithium containing 1 to 8 or 10 carbon atoms, lithium biphenyl, lithium naphthalene, 1,4-dilithiobutane, 1,5-dilithiopentane and other dilithio alphaomega alkanes such as DiLi-1A (Lithium Corporation of America), etc.

The polymerization of butadiene is usually effected with an anionic catalyst. The same catalyst may be used in producing the block copolymer. Usually a lithium catalyst is used although other alkali metal catalysts can be used.

The polymerization of the butadiene is carried to a molecular weight generally between 1,000 and 20,000 although the molecular weight is not exactly critical and higher and lower molecular weights may be employed. In this process the polysiloxane is added as a polymer—generally a polymer which has as high a molecular weight as can be obtained—which is generally 500,000 or more, although somewhat lower molecular weight material—as low as 100,000 molecular weight—may be employed.

The polymer which has the formula $(P_2Si)_x$ should have a molecular weight higher than the polysiloxane used in its preparation. However, because of impurities present, lower molecular weights are often obtained and are entirely satisfactory. For example, the viscosity of the initial silicone polymer as measured in toluene at 25°C. is 1.2 or thereabouts, whereas the intrinsic viscosities of the block polymers may be as low as 0.4 and still be acceptable, although generally block copolymers with an intrinsic viscosity of at least 0.75 are preferred. As the purity of the raw materials is improved it is to be expected that the viscosities of the block copolymers having the formula $(P_2Si)_x$ will be increased so that copolymers having an intrinsic viscosity of over 1.0 and up to 1.5 will be obtainable.

Tetrahydrofuran (THF) has been found to be a very satisfactory solvent for use in polymerization. The alkane solvents normally used in the polymerization of 1,3-butadiene cannot be employed without additives which promote the production of poly 1,2-butadiene.

When an anionic catalyst is employed, the temperatures of the polymerization of the butadiene should be at such a low temperature as to prevent or inhibit the reaction of the lithium with the solvent or additive, and for this reason temperatures in the range of −10° to −50°C. or lower will be employed. Practically, temperatures of about −25°C. will be used. The amount of catalyst used in the polymerization of the butadiene will be that usually employed for the production of a polybutadiene of the molecular weight desired as indicated above, and will depend upon the catalyst employed.

There are two possible procedures for producing the block copolymer, viz: (1) adding polysiloxane to a solution of polybutadienyl dilithium; (2) adding polybutadienyl dilithium to polysiloxane.

The polysiloxane is usually introduced in dry benzene solution. In operating according to the first method, the polysiloxane will react with the live butadiene polymer and the starting temperature of the block copolymerization will usually be about the temperature at which the live polymer is produced. Generally, the temperature of the block polymerization will be raised to about 40° to 100°C. and preferably 70°C. to equilibrate the molecular weights of the polysiloxane portions of the copolymer, since polysiloxane blocks of both high and low molecular weight are formed.

This solution is then neutralized with a mineral acid, usually acetic acid, in order to form terminal silanol bonds which will then spontaneously couple under those conditions to give an alternating block copolymer. After neutralization, the alternating block copolymer is usually recovered by evaporation of the solvent or by precipitation in a non-solvent such as methanol.

The following examples illustrate the preparation of the block copolymer.

EXAMPLE 1

To a clean, dry 28-oz. beverage bottle containing a magnetic stirrer was added 200 cc. of purified tetrahydrofuran (THF). After sealing with a syringe cap and purging with nitrogen the bottle was cooled to −50°C. in an acetone dry-ice bath. To this was added 3.7 cc. ($2.77 \times 10^{-3}$ moles) of a lithium biphenyl solution in THF followed by 12.5 gm. (0.241 mole) of purified butadiene. The temperature was held at −50°C. for 5 hours during which time the solution changed from green to red and became more viscous. To this solution was added 465 gm. of a 15 per cent solution of polydimethylsiloxane ($1.48 \times 10^{-4}$ moles) in benzene that had been dried previously over 4A molecular sieves. The bottle was then allowed to warm to room temperature before being heated for 18 hours in a 70°C. polymerization bath. The clean, colorless solution was then neutralized with $3 \times 10^{-3}$ moles of acetic acid in a hexane solution and was then heated for 2 hours more at 70°C. The solution becomes obviously more viscous indicating that the molecular weight has been materially increased. The polymer was isolated by precipitation in methanol. A clear polymer was obtained having an IV (Intrinsic Viscosity) = 0.44 and containing 18.5 per cent polybutadiene. The molecular weight was probably at least 30,000.

The polymer is preferably cured with dicumyl peroxide or other peroxide which gives $R(CH_3)_2CO\cdot$ radicals. It is to be understood that other peroxide curing agents may be employed.

EXAMPLE 2

The following refers to a copolymer mixed with Hi Sil 233 (a very finely ground silicon dioxide) which is known as a reinforcing agent. Other reinforcing agents may be employed. The following gives the properties of a block polymer compounded as stated, when air-aged at different temperatures for different times.

The polymer was milled with 40 parts of Hi Sil 233 and 0.5 part of dicumyl peroxide followed by a 45-minute cure at 160°C. in a 6 × 0.075 inch mold. Heat aging in a forced air oven gave a product with the following properties:

| TEMP., °F. | TIME (Hrs.) | TENSILE (psi) | % ELONG. | SHORE A |
|---|---|---|---|---|
| 550 | 8 | 150 | 170 | 48 |
| 550 | 24 | 230 | 100 | 65 |
| 600 | 8 | 225 | 70 | 69.5 |
| 600 | 24 | 325 | 12.5 | 83 |
| Orig. | | 75 | 115 | 48.5 |

Each of the foregoing aged products retained its elasticity and flexibility when subjected to high-temperature aging.

EXAMPLES 3 TO 5

Other block copolymers were produced using different amounts of polybutadiene (represented by BD in the following tables) of different molecular weights and producing copolymers of different viscosities which varied because of the impurities present. This information is summarized in the following tables which include the properties of the heat-aged block copolymers produced in each instance, the temperature and time of aging being given compared with the R.T. (Room Temperature) properties. In each instance the cure was carried out at 160°C. for 45 minutes and the compounds were prepared from 100 parts of the block polymer, 40 parts Hi Sil 233 and 0.5 part of dicumyl peroxide (essentially 98% active).

| Example | Aging Temp. °F. | Time, Hrs. | Shore A | % Elong. | 100% Modulus | Tensile psi | % Retained Tensile |
|---|---|---|---|---|---|---|---|
| 3 Intrinsic Viscosity = 0.44 3% BD of 3000 MW | | | | | | | |
| | RT | — | 55 | 160 | 150 | 275 | — |
| | 500 | 8 | 54 | 150 | 125 | 180 | 66 |
| | 550 | 8 | 61 | 105 | 250 | 250 | 91 |
| | 600 | 8 | 75.5 | 50 | — | 250 | 91 |
| 4 Intrinsic Viscosity = 0.52 7.5% BD of 8500 MW | | | | | | | |
| | RT | — | 70 | 80 | — | 210 | — |
| | 500 | 8 | 70 | 55 | — | 175 | 83 |
| | 550 | 8 | 70.5 | 10 | — | 100 | 43 |
| | 600 | 8 | 79 | 10 | — | 175 | 83 |
| 5 Intrinsic Viscosity = 0.71 1% BD of 9000 MW | | | | | | | |
| | RT | — | 57 | 210 | 50 | 125 | — |
| | 500 | 8 | 48 | 80 | — | 50 | 40 |
| | 550 | 8 | 48.5 | 185 | 50 | 50 | 40 |
| | 600 | 8 | 69 | 140 | 350 | 400 | 286 |

The block polymers have a half-weight loss temperature ($T_{0.5}$) above that of either of the polymeric materials from which they are produced and are, therefore, desirable for high temperature uses.

Thermogravimetric analyses (TGA) of the foregoing which examples were made by heating at 10°C. a minute with a flow rate of 2 cubic feet per minute of nitrogen over the sample. From this the temperature ($T_{0.5}$) in which there was a 50 per cent loss of total polymer weight was measured and recorded. This test applied to each of the foregoing samples gave the following results. For comparison, the temperatures ($T_{0.5}$) for the polydimethylsiloxane used in the polymers and a 1,2-polybutadiene resin highly cured are added and identified as A and B, respectively:

| Example | $T_{0.5}$ |
|---|---|
| 1 | 573° |
| 3 | 560° |
| 4 | 565° |
| 5 | 566° |
| A | 491° |
| B | 423° |

The following example refers to pilot-plant procedure.

EXAMPLE 6

Addition of Dilithium Polybutadiene to Polydimethylsiloxane

A 5-gallon reactor was cleaned and dried and purged with nitrogen. Ten pounds of dimethyl ether was added with 0.154 equivalents of lithium diphenyl and 504 grams of butadiene. After 1.5 hours at 45°F. a dilithium polybutadiene of 90 per cent vinyl structure with a GPC number average molecular weight of 7861 was produced.

While the polybutadiene was being polymerized, a 10.9 per cent solids solution of 110 pounds of polydimethylsiloxane in cyclohexane was prepared in a 50-gallon reactor. This solution was dried over silica gel and azeotropic distillation was carried out to less than 5 parts per million of water as measured by a Karl Fischer titration. To this dry solution was added the above dilithium polybutadiene solution, and the solution was then heated for 67 hours at 200°F. The solution was then transferred to a 55-gallon drum and the base present was titrated with acetic acid and then the block polymer was isolated by drum drying. The resultant polymer contained 8 per cent of polybutadiene and had a dilute solution viscosity of 0.72. It could not be separated into the corresponding homopolymers. This copolymer was mill blended with 10 parts of dicumyl peroxide per 100 parts of rubber, 40 parts of Hi Sil 233 and this was cured for 45 minutes at 160°C. to give a rubber of the following properties after heat aging:

| Aging Temp., °F. | Time (Hrs.) | Shore A | % Elong. | Tensile psi | % Retained Tensile |
|---|---|---|---|---|---|
| RT | — | 74.5 | 100 | 300 | — |
| 500 | 8 | 68 | 40 | 75 | 25 |
| 500 | 24 | 85 | 40 | 260 | 87 |
| 600 | 8 | 86 | 30 | 325 | 113 |
| 600 | 24 | 95 | 10 | 670 | 223 |

The following Examples 7 to 9 illustrate advantages of the invention over the prior art.

EXAMPLE 7

Addition of Polybutadienyl Lithium to Polydimethylsiloxane

A polybutadienyl lithium of about 2000 molecular weight was prepared in a 28-oz. bottle using tetrahydrofuran (THF) as a solvent and 9.42 cc. of a 1.54 molar butyllithium solution ($1.45 \times 10^{-2}$ moles) with 29 grams of butadiene. The monomer was allowed to polymerize at 20°C. for 5 hours and was then stored in a freezer overnight.

A solution of 30 grams of polydimethylsiloxane (molecular weight of 570,000) was dissolved in 250 cc. of thiophene-free benzene in a 28-oz. bottle by rotation in a water bath overnight at 50°C. To this solution the above polybutadienyl lithium solution was pressure-transferred. The deep red-yellow color was immediately lost and the solution viscosity fell rapidly.

The bottle was opened, neutralized with acetic acid and dried. The resulting liquid, upon standing over a week-end, separated into three phases in a ratio of 2:1:2. The upper phase was found to be 96 per cent polybutadiene; the lower phase was over 96 per cent polydimethylsiloxane; and the middle phase was approximately a 50/50 polybutadiene/polydimethylsiloxane block copolymer.

EXAMPLE 8

Addition of Polybutadienyl Lithium to Polydimethylsiloxane

Example 6 was repeated, except that 30 grams of polybutadiene and $6 \times 10^{-3}$ molecules of butyllithium were used, and the 5000 molecular weight polybutadienyl lithium was prepared just prior to use. Sixty grams of polydimethylsiloxane as dissolved in purified dried benzene. The solution was poured into methanol. Forty per cent of the product, obtained by pouring off the solution, was a polybutadiene-polydimethylsiloxane copolymer of about 70/30 composition. Curing this copolymer with 0.025 part of 100 parts of dicumyl peroxide at 145°C. for 15 minutes gave an elastic and flexible material.

EXAMPLE 9

Addition of Polydimethylsiloxane to Polybutadienyl Lithium

To a 28-oz. benzene bottle was added 75 grams of polydimethylsiloxane and 425 cc. of purified THF that had been dried by passage over 13X molecular sieves. The bottle was heated at 50°C. for 18 hours in a rotated water bath and when the polydimethylsiloxane was in solution the bottle was cooled and 4A molecular sieves were added and the bottle was allowed to stand for 3 days.

To another 28-oz. bottle equipped with a stirrer bar, there was added at 0°C. 250 cc. of purified THF, 1.13 cc. ($1.86 \times 10^{-4}$ moles) of butyllithium and 33 grams of butadiene. After 1 hour the above polydimethylsiloxane solution was pressurized into the bottle and the solution was heated to 70°C. in a rotating water bath for 3 days. The solution was then neutralized with acetic acid and heated for 2 additional hours at 70°C. and then isolated by precipitation in methanol. A precipitate that was 14.5 per cent polydimethylsiloxane and a milky suspension that was 69.8 per cent silicone were obtained by decanting. Curing the precipitate with 5 parts of DiCup for 1 minute at 160°C. gave a rubber with 500 per cent elongation.

Each of Examples 7 to 9 describe procedures for producing copolymers; neither the copolymers nor the procedures come within the scope of this invention. They cured only poorly but yielded a rubbery material.

I claim:

1. The method of producing a linear alternating block copolymer composed of (a) 1 to 80 per cent by weight of a polybutadiene with a vinyl content of at least 60 per cent by weight and (b) 20 to 99 per cent by weight of a linear polysiloxane having the formula $(R_2SiO)_x$ in which each R is a group from the class consisting of alkyl groups containing 1 to 4 carbon atoms, phenyl, tolyl and alpha and beta naphthyl, and $x$ is 1400 to 10,000, which method comprises joining the linear high molecular weight polysiloxane and a butadienyl dilithium in an alkane solvent and thereby producing said linear alternating block copolymer.

2. The process of claim 1 in which the polysiloxane is added to a solution of polybutadienyl dilithium.

3. The process of claim 1 in which polybutadienyl dilithium is added to a solution of the polysiloxane.

4. The process of claim 1 in which the polysiloxane is polydimethylsiloxane.

5. The process of claim 1 wherein said linear alternating block copolymer formed is further treated by neutralization with mineral acid to give a product of higher molecular weight.

\* \* \* \* \*